April 21, 1931. E. E. STURK 1,801,647
AUTOMOBILE WHEEL
Filed May 23, 1929
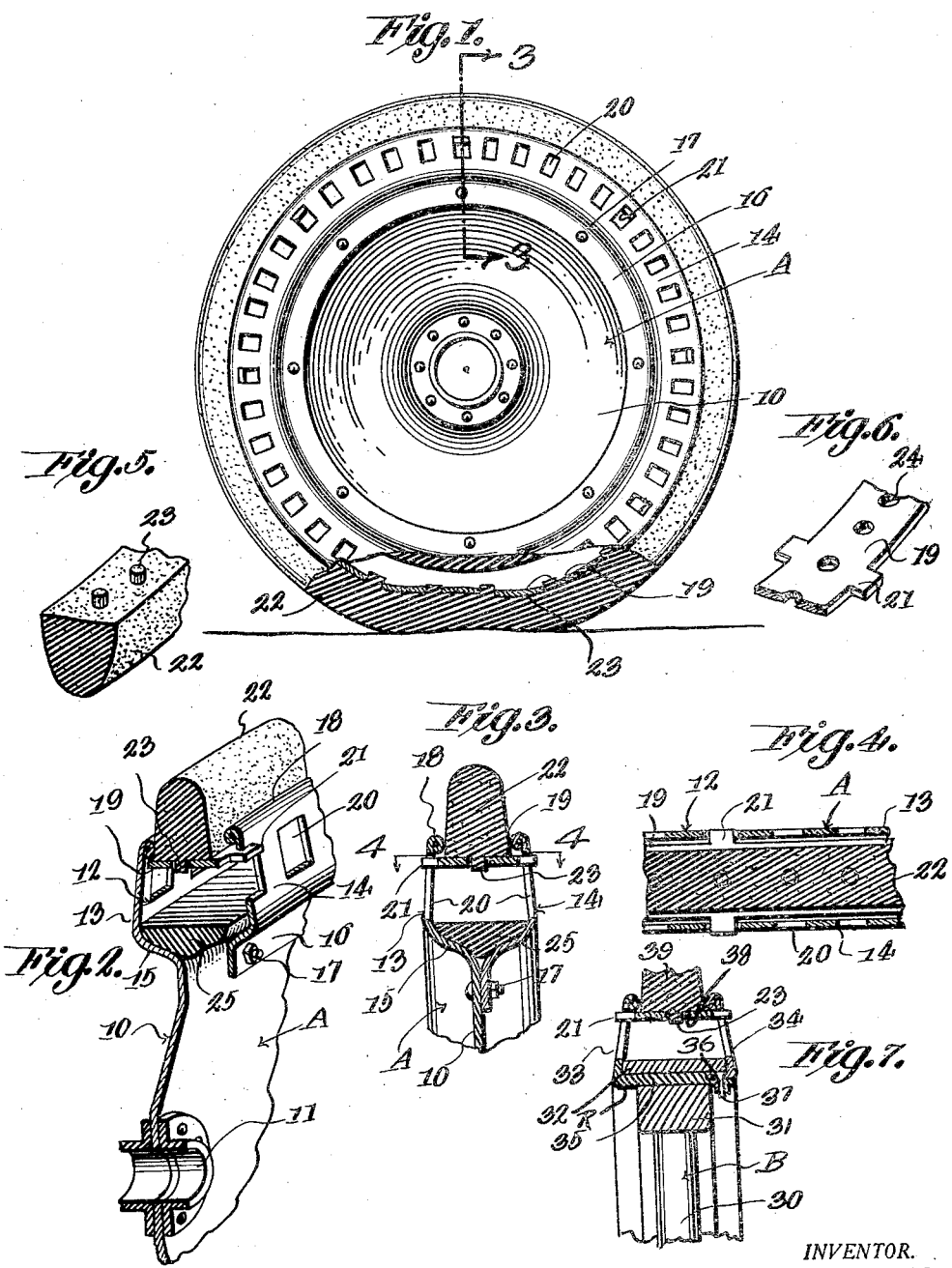
INVENTOR.
EWALD E. STURK
BY Irving L. Wathan
ATTORNEYS.

Patented Apr. 21, 1931

1,801,647

UNITED STATES PATENT OFFICE

EWALD E. STURK, OF HOLLYWOOD, CALIFORNIA

AUTOMOBILE WHEEL

Application filed May 23, 1929. Serial No. 365,454.

This invention appertains to vehicle wheels and more particularly to a wheel of the resilient type for absorbing shocks incident to the travel thereof over a roadway.

One of the primary objects of my invention is to provide an automobile wheel which will permit the use of solid rubber tires therewith, the wheel being so constructed as to absorb shocks and thereby eliminating the necessity of the use of pneumatic tires and the difficulties contingent with the use thereof.

Another salient object of my invention is the provision of a vehicle wheel having a novel rim or felly of substantially hollow construction supporting an annular band of spring steel, the band having associated therewith the tread or solid rubber tire of the wheel, the band forming means for absorbing shocks.

A further object of my invention is the provision of novel means for connecting the tire with the spring band so as to prevent circumferential creeping of the tire relative to the band during rotation of the wheel.

A further object of my invention is the provision of an annular bumper pad carried by the wheel and arranged inwardly of the spring band, the annualr bumper pad being formed of cushioning material so as to absorb shocks and limit the inward flexing movement of the band should the same be subjected to undue stress or strain.

A still further object of my invention is to provide an improved resilient wheel for use in connection with automobiles of the pleasure and truck types which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawing, in which drawing:

Figure 1 is a side elevation of my improved wheel showing parts thereof broken away and in section;

Figure 2 is a fragmentary perspective view of my wheel illustrating the spring band carried by the hollow rim or felly thereof;

Figure 3 is a section taken through the wheel on the line 3—3 of Figure 1 looking in the direction of the arrows;

Figure 4 is a detail section taken on the line 4—4 of Figure 3 looking in the direction of the arrows;

Figure 5 is a detail fragmentary perspective view of the solid rubber tire showing the tits carried thereby for connection with the resilient band;

Figure 6 is a fragmentary detail perspective view of the novel spring band;

Figure 7 is a detail section through a wheel illustrating my invention applied to a wheel of the spoke or artillery type.

Referring to the drawing in detail, wherein similar reference characters designate corresponding parts throughout the several views, the letter A generally indicates my improved wheel, which in the present instance is shown to be of the disk type. The wheel A comprises the conventional dished disk body 10 supporting a conventional hub 11 for association with a vehicle. The periphery of the disk body 10 is provided with a novel hollow felly or rim 12, which includes annular side walls 13 and 14 which can gradually taper toward one another at the periphery thereof. The side wall 13 can be formed integral with the disk body 10 by means of an annular offset connecting flange 15 while the wall 14 can be connected with the body by means of an attaching flange 16 bolted or otherwise secured to the body by means of bolts 17. These spaced walls 13 and 14 form an annular housing or channel therebetween and the outer edges thereof are rolled to provide retaining beads 18 for a purpose which will be later described. The annular channel defined by the side walls 13 and 14 can receive therebetween the annular band 19, which is formed of spring steel to absorb shocks, and the band is limited in its outward movement by the beads 18. The side walls 13 and 14 can be provided with slots 20 for permitting ventilation of the rim or felly and to also prevent the collection of débris within the rim or felly.

If preferred, the side edges of the spring steel band 19 can be provided with laterally extending drive lugs 21 for engagement in certain of the slots 20, so as to set up a positive driving connection between the spring steel band and the wheel.

The spring steel band 19 can carry any preferred type of tire and in the present instance I have shown the same equipped with a solid rubber tire 22, the inner face of which can be provided with tits 23 for engagement in openings 24 formed in the band 19 and thereby bring about a positive or driving connection between said tire and band.

The tread of the tire can be made in any suitable design that may be desired for gripping the roadway.

In operation of the improved wheel, the band 19 will flex under load and will absorb any shocks transmitted thereto, thereby forming a resilient wheel which will eliminate the necessity of the use of pneumatic tires.

If preferred, I can provide an annular pad 25 formed of cushioning material which can be carried by the wheel inward of the spring band 19, and the band can engage this pad when the same is flexed under extreme heavy load or shock, and the pad will form means for absorbing shocks.

In Figure 7 of the drawing I have shown my invention applied to a wheel of the spoke or artillery type and the wheel is generally indicated by the reference character B. This wheel includes the usual radial spokes 30 carrying the felly 31 and the felly has associated therewith my novel rim R. The rim R in this form also includes the converging side walls 33 and 34. A bumper 32 is carried by the rim R as shown in Figure 7. The side wall 33 can have formed thereon the annular felly engaging band 35 for connection with the felly 31 while the wall 34 can be provided with an attaching flange 36 which can be secured to the band 35 by means of bolts 37. In all other respects this rim is of the same type as the rim 12 and receives the resilient band 38 carrying the tire 39.

Changes in details within the purview of the appended claim may be made without departing from the spirit or the scope of this invention, but what I claim as new is:

In a resilient wheel, a rim including inner and outer spaced side walls provided with slots therein opening out through the outer faces of said walls, an annular band of resilient steel arranged between said walls and provided with laterally extending drive lugs slidably received in certain of said slots and normally extending beyond the outer faces of the walls, and a solid tire secured to the band.

In testimony whereof I affix my signature.

EWALD E. STURK.